United States Patent [19]
Moskovich

[11] 4,258,980
[45] Mar. 31, 1981

[54] RETROFOCUS LENS

[75] Inventor: Jacob Moskovich, Cincinnati, Ohio

[73] Assignee: Vivitar Corporation, Santa Monica, Calif.

[21] Appl. No.: 97,543

[22] Filed: Nov. 26, 1979

Related U.S. Application Data

[63] Continuation-in-part of Ser. No. 941,524, Sep. 11, 1978, abandoned.

[51] Int. Cl.³ .................................................. G02B 9/64
[52] U.S. Cl. .................................................. 350/463
[58] Field of Search ..................... 350/214, 176, 177

[56] References Cited

U.S. PATENT DOCUMENTS

| | | | |
|---|---|---|---|
| Re. 27,799 | 10/1973 | Shimizu | 350/2̄14 |
| 3,512,874 | 5/1970 | Woltche | 350/214 |
| 3,740,120 | 6/1973 | Rühl | 350/214 |
| 3,748,021 | 7/1973 | Tajima | 350/214 |
| 3,870,400 | 3/1975 | Yamashita et al. | 350/214 |
| 3,884,556 | 5/1975 | Nakagawa | 350/214 |

*Primary Examiner*—Paul A. Sacher
*Attorney, Agent, or Firm*—DeLio and Montgomery

[57] ABSTRACT

A retrofocus lens subtending a field angle up to 84° or more characterized by compactness, fast relative aperture, and good aberration correction. These characteristics are obtained by selection of the relative powers of a front negative and a rear positive group, and the dispersion of the front elements.

16 Claims, 9 Drawing Figures

RETROFOCUS LENS

This application is a continuation-in-part of application Ser. No. 941,524, filed Sep. 11, 1978 and now abandoned.

This invention relates to lenses of the retrofocus type and more particularly relates to such a lens having a relatively fast speed and compact size.

Lenses of the retrofocus type having a large relative aperture and close focusing capability are presently available. Examples of such lenses of excellent quality are disclosed and claimed in U.S. Pat. No. 4,099,849 and one is marketed as a Vivitar Series I lens by Vivitar Corporation of Santa Monica, CA. However, this lens and others of high quality are relatively expensive and also are relatively large as compared to the normal 50mm equivalent focal length lens for a single lens reflex camera having a 24×36mm image frame.

Accordingly, the present invention provides a new and improved retrofocus lens of high quality, yet reduced cost, while being more compact and embodying the ability to focus on near objects with a magnification of essentially 0.1, while subtending a field of up to 84°.

The design and configuration of a lens embodying the invention results in a smaller overall length and small diameter front lens grouping which provides a more compact configuration than would normally be expected for a lens of comparable equivalent focal length and relative aperture.

A lens embodying the invention is well corrected over the focusing range normally available in a lens of this field angle and in the closer focusing distance provided by this lens.

Briefly stated, the invention in one form thereof comprises a lens of eight elements divided into front and rear groupings. The front grouping comprises a positive element followed by two negative menisci and is overall of negative power. The second grouping comprises a positive element, the aperture defining means, another positive element, followed by a concave element, a positive meniscus concave to the object, and a final bi-convex element. The second grouping is of positive power. Such a lens embodies certain parameters hereinafter pointed out.

During focusing, from infinity to near objects, all elements move forward while a portion of the rear grouping may move at a faster rate.

An object of this invention is to provide a new and improved lens of the retrofocus type.

Another object of this invention is to provide a retrofocus lens which is compact, has a large relative aperture, and will close focus to a magnification of 0.1 while subtending a field of up to 84° or larger.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

Figure 1:
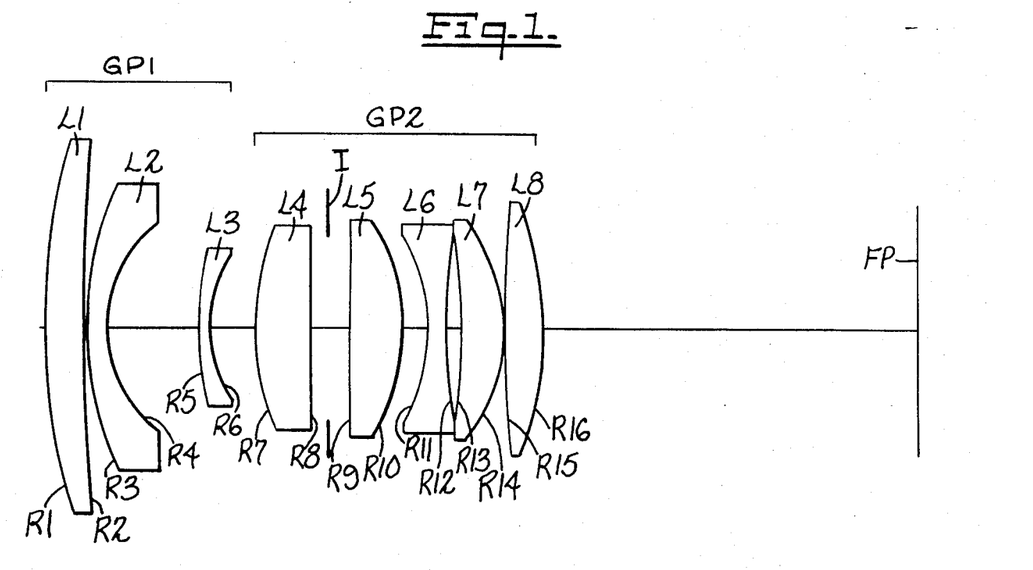
FIG. 1 is a side elevation of a lens form embodying the invention.

Referring now to FIG. 1, a lens embodying the invention may comprise eight air spaced elements L1–L8 having surfaces defined on radii R1–R16.

Elements L1–L3 form a first group G1 of negative overall power while elements L4–L8 define a second group G2 of positive overall power.

As will hereinafter be made apparent, during focusing from infinity to near distance to provide a one to ten magnification, there is differential movement of elements L1–L4 and L5–L8 to permit closer focusing. If close focusing is not an objective of the lens, the differential movement may not be utilized.

From the object side, the lens comprises a positive meniscus convex to the object L1, a second element L2 which is a negative meniscus convex to the object, and a third element L3 which is a negative meniscus convex to the object. Elements L1–L3 form front grouping G1 of negative power, having an equivalent focal length (EFL) $F_1$.

The rear group G2 comprises a positive element L4 followed by an adjustable aperture defining means in the form of an iris I, an element L5 of positive power convex to the image, a bi-concave element L6, a positive meniscus L7 convex to the image, and an element L8 which is bi-convex. The elements L4–L8 comprise a second group G2 having an EEL $F_2$.

A lens embodying the invention has the following parameters:

$$0.7 F_o < F_1 \leq 1.0 F_o \tag{1}$$

$$0.8 F_o < F_2 < 1.1 F_o \tag{2}$$

$$52 < (V_1 + V_2 + V_3)/3 < 70 \tag{3}$$

$$23 < V_4 < 33 \tag{4}$$

where
$F_o$ is the focus length of the overall lens,
$F_1$ is the equivalent focal length of the first grouping G1.
$F_2$ is the equivalent focal length of the second grouping G2, and
$V_1, V_2, V_3$ and $V_4$ are the dispersions as measured by the Abbe numbers of elements L1, L2, L3 and L4.

The range selected under parameter (1) is such that the aberrations generated in the front grouping G1 may be well corrected in the second grouping G2. For example, if the absolute value of $F_1$ is smaller than the 0.7 $F_o$, then the aberrations generated in the front group of the lens cannot be corrected without the rear grouping becoming unusually complex. Moreover, if $F_1$ should become larger than 1.0 $F_o$, the overall dimensioning of the lens will increase and the object of compactness will be lost.

By maintaining the EFL $F_2$ of group G2 in the range specified in relation to $F_1$, the EFL of group G1, the back focal length (BFL) of the lens is decreased, resulting in a shorter front vertex distance (VFD). If $F_2$ is held to be less than 1.1 $F_o$, the power of the rear group will be sufficient to balance the aberrations generated in the strongly negative front group G1 and still maintain compactness of the lens.

In attempting to keep a wide angle lens compact, one of the most prevalent problems is the correction of distortion. Balancing the distortion may lead to chromatic variation of distortion. Therefore, the dispersion of the lens elements becomes critical. The parameters (3) and (4) relating to lens dispersion are necessary to favorably correct chromatic aberration, including lateral color and chromatic variation of distortion.

Prescriptions of six embodiments of the invention are set forth in Tables 1-6. In these embodiments, the lenses are scaled to a unity focal length and all dimensions are given as ratios thereof. The lens element thickness dimensions T are the thickness of the lens and the spacings S are the axial air spacings between the lens surfaces. The dispersion as measured by the Abbe number is given as $V_d$, and the index of refraction is $N_d$. Positive radii are struck from the right on the optical axis, while negative radii are struck from the left on the optical axis.

In the drawings, the lens surfaces are defined on radii R1-R16 from the object end. For simplicity, the facing surfaces of elements L4 and L5 are shown as plano in the drawings since these surfaces are defined on very large radii R8 and R9 which may be positive, negative, or plano, as shown by the examples.

TABLE 1

Relative Aperture = 2.0  $F_o$ = 1.0  Field Angle = 84°
$F_1$ = −0.79  BFL = 1.59  $F_2$ = 0.99

| Element | Surface Radii (R) | Lens Element Thickness (T) | Spacing Between Lens Elements (S) | $N_d$ | $V_d$ |
|---|---|---|---|---|---|
| L1 | R1 = 2.752 | $T_1$ = 0.167 | | 1.697 | 55.5 |
|    | R2 = 10.490 | | | | |
|    | | | $S_1$ = .008 | | |
| L2 | R3 = 1.421 | $T_2$ = 0.082 | | 1.697 | 55.5 |
|    | R4 = .530 | | | | |
|    | | | $S_2$ = .387 | | |
| L3 | R5 = 1.340 | $T_3$ = 0.061 | | 1.603 | 60.7 |
|    | R6 = 0.580 | | | | |
|    | | | $S_3$ = .176 | | |
| L4 | R7 = 1.032 | $T_4$ = 0.245 | | 1.717 | 29.5 |
|    | R8 = −9.947 | | | | |
|    | | | $S_4$ = .155 | | |
| L5 | R9 = ∞ | $T_5$ = 0.221 | | 1.603 | 60.7 |
|    | R10 = −0.799 | | | | |
|    | | | $S_5$ = .101 | | |
| L6 | R11 = −0.780 | $T_6$ = 0.074 | | 1.805 | 25.5 |
|    | R12 = 2.379 | | | | |
|    | | | $S_6$ = .069 | | |
| L7 | R13 = −2.431 | $T_7$ = 0.169 | | 1.640 | 60.2 |
|    | R14 = −0.741 | | | | |
|    | | | $S_7$ = .008 | | |
| L8 | R15 = 4.377 | $T_8$ = 0.161 | | 1.640 | 60.2 |
|    | R16 = −1.385 | | | | |

TABLE 2

Relative Aperture = 2.0  $F_o$ = 1.0  Field Angle = 72°
$F_1$ = −0.996  BFL = 1.36  $F_2$ = 0.926

| Element | Surface Radii (R) | Lens Element Thickness (T) | Spacing Between Lens Elements (S) | $N_d$ | $V_d$ |
|---|---|---|---|---|---|
| L1 | R1 = 1.976 | $T_1$ = 0.154 | | 1.517 | 64.2 |
|    | R2 = 10.526 | | | | |
|    | | | $S_1$ = 0.007 | | |
| L2 | R3 = 0.794 | $T_2$ = 0.070 | | 1.678 | 55.5 |
|    | R4 = 0.401 | | | | |
|    | | | $S_2$ = 0.203 | | |
| L3 | R5 = 2.113 | $T_3$ = 0.056 | | 1.487 | 70.4 |
|    | R6 = 0.717 | | | | |
|    | | | $S_3$ = 0.182 | | |
| L4 | R7 = 0.878 | $T_4$ = 0.193 | | 1.755 | 27.5 |
|    | R8 = 4.104 | | | | |
|    | | | $S_4$ = 0.132 | | |
| L5 | R9 = ∞ | $T_5$ = 0.193 | | 1.640 | 60.2 |
|    | R10 = −0.690 | | | | |
|    | | | $S_5$ = 0.085 | | |
| L6 | R11 = −0.591 | $T_6$ = 0.053 | | 1.805 | 25.5 |
|    | R12 = 2.583 | | | | |
|    | | | $S_6$ = 0.066 | | |
| L7 | R13 = −1.341 | $T_7$ = 0.140 | | 1.658 | 57.3 |
|    | R14 = −0.610 | | | | |
|    | | | $S_7$ = 0.007 | | |
| L8 | R15 = 3.089 | $T_8$ = 0.193 | | 1.697 | 55.5 |
|    | R16 = −1.236 | | | | |

TABLE 3

Relative Aperture = 2.0  $F_o$ = 1.0  Field Angle = 72°
$F_1$ = −0.94  BFL = 1.37  $F_2$ = 0.93

| Element | Surface Radii (R) | Lens Element Thickness (T) | Spacing Between Lens Elements (S) | $N_d$ | $V_d$ |
|---|---|---|---|---|---|
| L1 | R1 = 1.552 | $T_1$ = 0.144 | | 1.517 | 64.2 |
|    | R2 = 8.704 | | | | |
|    | | | $S_1$ = 0.007 | | |
| L2 | R3 = 1.233 | $T_2$ = 0.070 | | 1.667 | 57.7 |
|    | R4 = 0.434 | | | | |
|    | | | $S_2$ = 0.290 | | |
| L3 | R5 = 1.782 | $T_3$ = 0.056 | | 1.487 | 70.4 |
|    | R6 = 0.754 | | | | |
|    | | | $S_3$ = 0.148 | | |
| L4 | R7 = 0.828 | $T_4$ = 0.193 | | 1.757 | 28.6 |
|    | R8 = 3.553 | | | | |
|    | | | $S_4$ = 0.133 | | |
| L5 | R9 = 3.592 | $T_5$ = 0.193 | | 1.643 | 59.8 |
|    | R10 = −0.771 | | | | |
|    | | | $S_5$ = 0.082 | | |
| L6 | R11 = −0.616 | $T_6$ = 0.054 | | 1.805 | 25.5 |
|    | R12 = 1.955 | | | | |
|    | | | $S_6$ = 0.075 | | |
| L7 | R13 = −1.320 | $T_7$ = 0.133 | | 1.659 | 58.4 |
|    | R14 = −0.627 | | | | |
|    | | | $S_7$ = 0.007 | | |
| L8 | R15 = 3.027 | $T_8$ = 0.148 | | 1.697 | 55.5 |

TABLE 3-continued

Relative Aperture = 2.0  $F_o$ = 1.0  Field Angle = 72°
$F_1$ = −0.94  BFL = 1.37  $F_2$ = 0.93

| Element | Surface Radii (R) | Lens Element Thickness (T) | Spacing Between Lens Elements (S) | $N_d$ | $V_d$ |
|---|---|---|---|---|---|
| | R16 = −1.280 | | | | |

TABLE 4

Relative Aperture = 2.0  $F_o$ = 1.0  Field Angle = 72°
$F_1$ = −0.89  BFL = 1.39  $F_2$ = 0.91

| Element | Surface Radii (R) | Lens Element Thickness (T) | Spacing Between Lens Elements (S) | $N_d$ | $V_d$ |
|---|---|---|---|---|---|
| L1 | R1 = 1.736 | $T_1$ = 0.163 | | 1.697 | 55.5 |
| | R2 = 7.514 | | | | |
| | | | $S_1$ = 0.004 | | |
| L2 | R3 = 1.517 | $T_2$ = 0.082 | | 1.697 | 55.5 |
| | R4 = 0.440 | | | | |
| | | | $S_2$ = 0.221 | | |
| L3 | R5 = 1.288 | $T_3$ = 0.061 | | 1.487 | 70.4 |
| | R6 = 0.652 | | | | |
| | | | $S_3$ = 0.151 | | |
| L4 | R7 = 0.866 | $T_4$ = 0.193 | | 1.744 | 27.6 |
| | R8 = 12.092 | | | | |
| | | | $S_4$ = 0.132 | | |
| L5 | R9 = 5.954 | $T_5$ = 0.193 | | 1.651 | 59.1 |
| | R10 = −0.725 | | | | |
| | | | $S_5$ = 0.049 | | |
| L6 | R11 = −0.646 | $T_6$ = 0.097 | | 1.805 | 25.5 |
| | R12 = 1.889 | | | | |
| | | | $S_6$ = 0.067 | | |
| L7 | R13 = −1.917 | $T_7$ = 0.169 | | 1.686 | 56.2 |
| | R14 = −0.661 | | | | |
| | | | $S_7$ = 0.004 | | |
| L8 | R15 = 4.018 | $T_8$ = 0.166 | | 1.640 | 60.2 |
| | R16 = −1.432 | | | | |

TABLE 5

Relative Aperture = 2.0  $F_o$ = 1.0  Field Angle = 84°
$F_1$ = −0.81  BFL = 1.6  $F_2$ = 0.97

| Element | Surface Radii (R) | Lens Element Thickness (T) | Spacing Between Lens Elements (S) | $N_d$ | $V_d$ |
|---|---|---|---|---|---|
| L1 | R1 = 2.384 | $T_1$ = 0.201 | | 1.542 | 61.1 |
| | R2 = 13.791 | | | | |
| | | | $S_1$ = 0.008 | | |
| L2 | R3 = 1.354 | $T_2$ = 0.082 | | 1.697 | 55.5 |
| | R4 = 0.510 | | | | |
| | | | $S_2$ = 0.320 | | |
| L3 | R5 = 1.449 | $T_3$ = 0.061 | | 1.487 | 70.4 |
| | R6 = 0.543 | | | | |
| | | | $S_3$ = 0.199 | | |
| L4 | R7 = 1.042 | $T_4$ = 0.225 | | 1.705 | 29.5 |
| | R8 = 6.649 | | | | |
| | | | $S_4$ = 0.157 | | |
| L5 | R9 = 84.000 | $T_5$ = 0.225 | | 1.614 | 52.7 |
| | R10 = 0.743 | | | | |

TABLE 5-continued

Relative Aperture = 2.0  $F_o$ = 1.0  Field Angle = 84°
$F_1$ = −0.81  BFL = 1.6  $F_2$ = 0.97

| Element | Surface Radii (R) | Lens Element Thickness (T) | Spacing Between Lens Elements (S) | $N_d$ | $V_d$ |
|---|---|---|---|---|---|
| | | | $S_5$ = 0.062 | | |
| L6 | R11 = −0.727 | $T_6$ = 0.074 | | 1.805 | 25.5 |
| | R12 = 2.171 | | | | |
| | | | $S_6$ = 0.066 | | |
| L7 | R13 = −3.165 | $T_7$ = 0.169 | | 1.618 | 61.1 |
| | R14 = −0.721 | | | | |
| | | | $S_7$ = 0.008 | | |
| L8 | R15 = 6.386 | $T_8$ = 0.161 | | 1.640 | 60.2 |
| | R16 = −1.353 | | | | |

TABLE 6

Relative Aperture = 2.0  $F_o$ = 1.0  Field Angle = 84°
$F_1$ = −0.79  BFL = 1.59  $F_2$ = 0.99

| Element | Surface Radii (R) | Lens Element Thickness (T) | Spacing Between Lens Elements (S) | $N_d$ | $V_d$ |
|---|---|---|---|---|---|
| L1 | R1 = 2.153 | $T_1$ = 0.203 | | 1.487 | 70.4 |
| | R2 = 17.462 | | | | |
| | | | $S_1$ = 0.004 | | |
| L2 | R3 = 1.481 | $T_2$ = 0.082 | | 1.697 | 55.5 |
| | R4 = 0.520 | | | | |
| | | | $S_2$ = 0.368 | | |
| L3 | R5 = 1.513 | $T_3$ = 0.061 | | 1.487 | 70.4 |
| | R6 = 0.547 | | | | |
| | | | $S_3$ = 0.163 | | |
| L4 | R7 = 1.231 | $T_4$ = 0.225 | | 1.753 | 27.3 |
| | R8 = −7.445 | | | | |
| | | | $S_4$ = 0.201 | | |
| L5 | R9 = ∞ | $T_5$ = 0.225 | | 1.669 | 57.6 |
| | R10 = −0.758 | | | | |
| | | | $S_5$ = 0.065 | | |
| L6 | R11 = −0.877 | $T_6$ = 0.174 | | 1.805 | 25.5 |
| | R12 = 2.056 | | | | |
| | | | $S_6$ = 0.057 | | |
| L7 | R13 = −6.073 | $T_7$ = 0.169 | | 1.607 | 61.7 |
| | R14 = −0.836 | | | | |
| | | | $S_7$ = 0.004 | | |
| L8 | R15 = 4.717 | $T_8$ = 0.154 | | 1.640 | 60.2 |
| | R16 = −1.710 | | | | |

In the foregoing embodiments, the last four elements may move differentially with respect to the first four elements, but at a linear rate. In Tables 1-6, the given spacing S4 is at infinity. The spacings S4 at a magnification of 1:10 are given below in Table 7, as well as the EFL's $F_1$ and $F_2$.

TABLE 7

| Table | $S_4$ | $F_1$ | $F_2$ |
|---|---|---|---|
| 1 | .135 | −0.79 | 0.99 |
| 2 | .116 | −0.996 | 0.926 |
| 3 | .117 | −0.94 | 0.93 |
| 4 | .116 | −0.89 | 0.91 |
| 5 | .135 | −0.81 | 0.97 |

TABLE 7 -continued

| Table | S₄ | F₁ | F₂ |
|---|---|---|---|
| 6 | .180 | −0.79 | 0.99 |

Figure 2A:
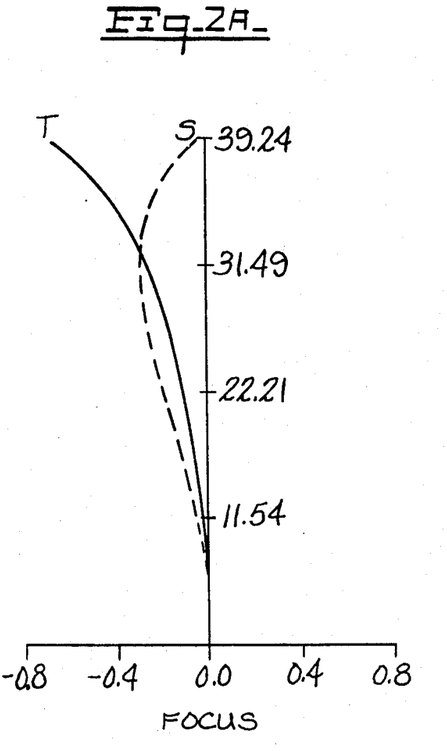
FIGS. 2A and 2B are graphical representations of astigmatic field curvature for a lens as set forth in Table 1, at infinity and at a magnification of 1:10, respectively.
Figure 2B:
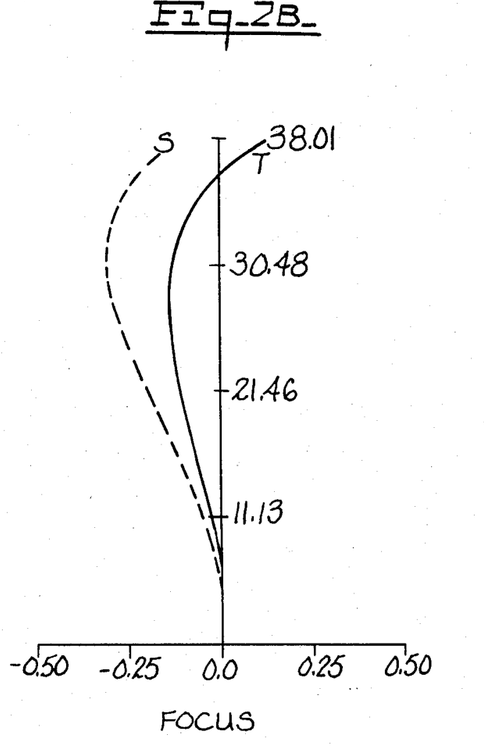
Figure 3A:
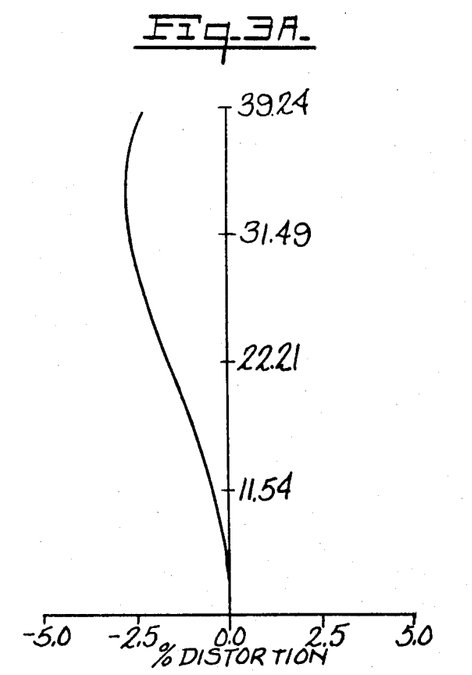
FIGS. 3A and 3B are plots of the distortion curves of the lens of Table 1 at infinity and at a magnification of 1:10, respectively.
Figure 3B:
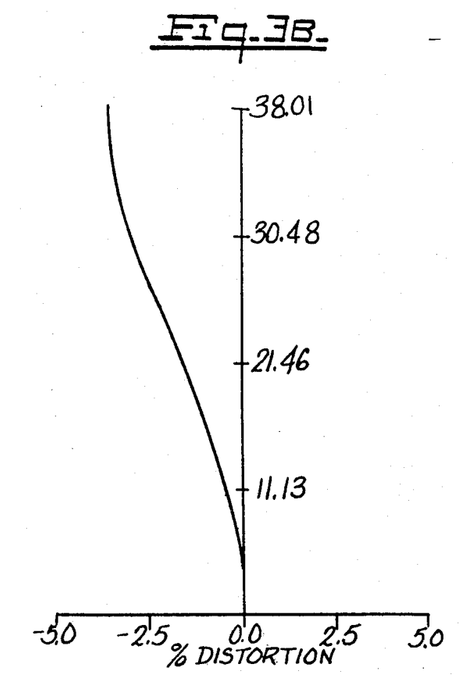

FIGS. 2A and 2B represent the astigmatic field curves of the lens of Table 1 at infinity and at 1:10 magnification, respectively. The ordinate is semi-field angle and the abscissi are deviations from the image plane in millimeters. FIGS. 3A and 3B represent the degree of correction of astigmatism of the lens of FIG. 1 at infinity and at a magnification of 1:10, respectively. The ordinates are semi-field angle and the abscissi are per cent distortion. The curves S and T represent sagittal and tangential sags of light, respectively. FIGS. 3A and 3B show the lens to be well corrected for astigmatism, a primary consideration in high speed lenses of large relative aperture.

Figure 4A:
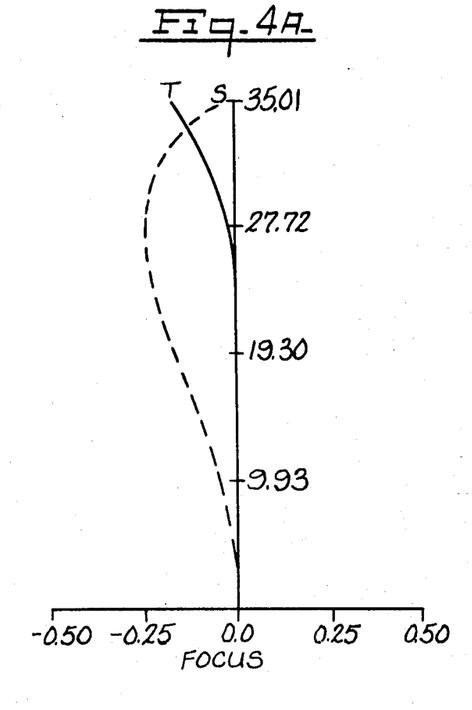
FIGS. 4A and 4B are graphical representations of astigmatic field curvature for a lens as set forth in Table 2, at infinity and at a magnification of 1.10, respectively.
Figure 4B:
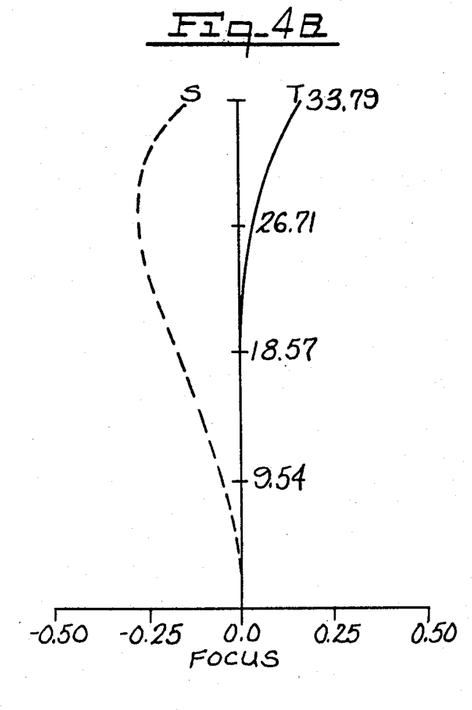
Figure 5A:
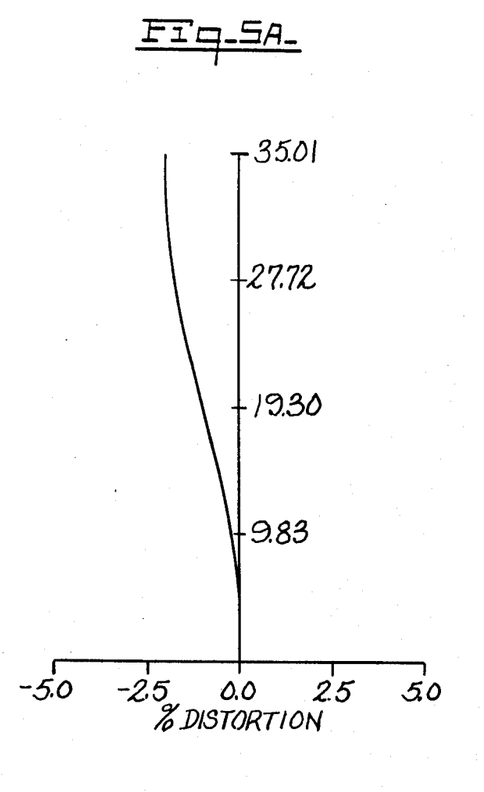
FIGS. 5A and 5B are plots of the distortion curves of the lens of Table 2 at infinity and at a magnification of 1:10, respectively.
Figure 5B:
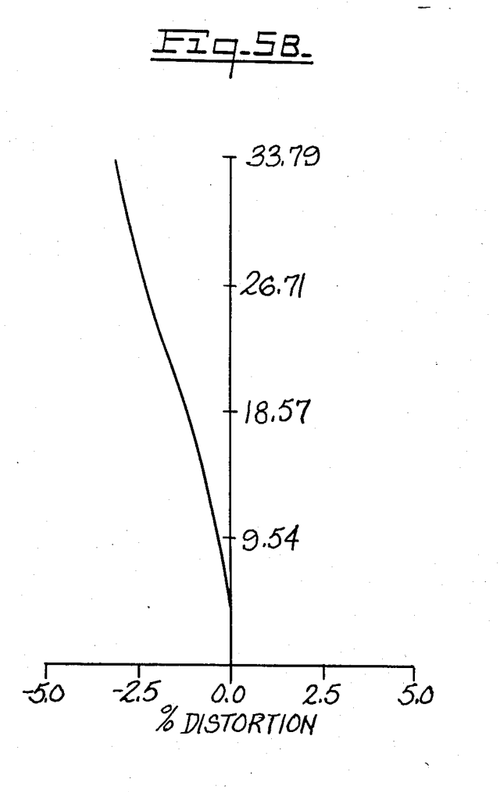

FIGS. 4A and 4B represent the astigmatic field curves of the lens of Table 2 at infinity and at 1:10 magnification, respectively. The ordinate is semi-field angle and the abscissi are deviations from the image plane in millimeters. FIGS. 5A and 5B represent the degree of correction of astigmatism of the lens of FIG. 1 at infinity and at a magnification of 1:10, respectively. The ordinates are semi-field angle and the abscissi are per cent distortion. The curves S and T represent sagittal and tangential sags of light, respectively. FIGS. 5A and 5B show the lens to be well corrected for astigmatism, a primary consideration in high speed lenses of large relative aperture.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A retrofocus lens of eight airspaced elements comprising from the object end a first positive meniscus convex to the object, second and third negative menisci convex to the object, a fourth positive element convex to the object and having an image side surface defined on a radius at least three times the equivalent focal length of the lens, an aperture defining means, a fifth postive element having an object side surface defined on a radius at least three times the equivalent focal length of the lens and a convex image side surface, a sixth biconcave element spaced at least 0.04 of the equivalent focal length of said lens from said fifth element, a seventh positive meniscus convex to the image end, and an eighth biconvex element, at least one of said convex surfaces said fourth and fifth elements being defined on a radius less than the equivalent focal length of said lens.

2. The lens of claim 1 where said first through fourth elements have Abbe numbers V1–V4, respectively, and $$57 < (V1 + V2 + V3)/3 < 66$$

$$27 < V4 < 30.$$

3. The lens of claim 1 where the sum of the radii defining the convex surfaces of the fourth and fifth elements is no more than twice the equivalent focal length of the lens.

4. The lens of claim 1 where the air space between the fourth and fifth elements varies as the lens is focused to its closest focusing distance.

5. A lens according to claim 1 defined substantially as follows where the equivalent focal length of the lens is 1.0 and all dimensions are ratios of the actual dimension to the equivalent focal length:

| Element | Surface Radii (R) | Lens Element Thickness (T) | Spacing Between Lens Elements (S) | N_d | V_d |
|---|---|---|---|---|---|
| L1 | R1 = 2.752 | T₁ = 0.167 | | 1.697 | 55.5 |
| | R2 = 10.490 | | S₁ = .008 | | |
| L2 | R3 = 1.421 | T₂ = 0.082 | | 1.697 | 55.5 |
| | R4 = .530 | | S₂ = .387 | | |
| L3 | R5 = 1.340 | T₃ = 0.061 | | 1.603 | 60.7 |
| | R6 = 0.580 | | S₃ = .176 | | |
| L4 | R7 = 1.032 | T₄ = 0.245 | | 1.717 | 29.5 |
| | R8 = −9.947 | | S₄ = .155 | | |
| L5 | R9 = ∞ | T₅ = 0.221 | | 1.603 | 60.7 |
| | R10 = −0.799 | | S₅ = .101 | | |
| L6 | R11 = −0.780 | T₆ = 0.074 | | 1.805 | 25.5 |
| | R12 = 2.379 | | S₆ = .069 | | |
| L7 | R13 = −2.431 | T₇ = 0.169 | | 1.640 | 60.2 |
| | R14 = −0.741 | | S₇ = .008 | | |
| L8 | R15 = 4.377 | T₈ = 0.161 | | 1.640 | 60.2 |
| | R16 = −1.385 | | | | | where L1–L8 are the lens elements from the object side, R1–R16 are the surface radii of the lens elements, T1–T8 are the axial thicknesses of elements L1–L8 respectively, S1–S7 are the axial spacings between elements L1–L8, $N_d$ is the index of refraction of the elements and $V_d$ is the dispersion of the elements measured by the Abbe number.

6. A lens according to claim 1 defined substantially as follows where the equivalent focal length of the lens is 1.0 and all dimensions are ratios of the actual dimension to the equivalent focal length:

| Element | Surface Radii (R) | Lens Element Thickness (T) | Spacing Between Lens Elements (S) | N_d | V_d |
|---|---|---|---|---|---|
| L1 | R1 = 1.976 | T₁ = 0.154 | | 1.517 | 64.2 |
| | R2 = 10.526 | | S₁ = 0.007 | | |
| L2 | R3 = 0.794 | T₂ = 0.070 | | 1.678 | 55.5 |
| | R4 = 0.401 | | S₂ = 0.203 | | |
| L3 | R5 = 2.113 | T₃ = 0.056 | | 1.487 | 70.4 |
| | R6 = 0.717 | | | | |

-continued

| Element | Surface Radii (R) | Lens Element Thickness (T) | Spacing Between Lens Elements (S) | $N_d$ | $V_d$ |
|---|---|---|---|---|---|
| | | | $S_3 = 0.182$ | | |
| L4 | $R_7 = 0.878$ | $T_4 = 0.193$ | | 1.755 | 27.5 |
| | $R_8 = 4.104$ | | | | |
| | | | $S_4 = 0.132$ | | |
| L5 | $R_9 = \infty$ | $T_5 = 0.193$ | | 1.640 | 60.2 |
| | $R_{10} = -0.690$ | | | | |
| | | | $S_5 = 0.085$ | | |
| | $R_{11} = -0.591$ | | | | |
| L6 | | $T_6 = 0.053$ | | 1.805 | 25.5 |
| | $R_{12} = 2.583$ | | | | |
| | | | $S_6 = 0.066$ | | |
| | $R_{13} = -1.341$ | | | | |
| L7 | | $T_7 = 0.140$ | | 1.658 | 57.3 |
| | $R_{14} = -0.610$ | | | | |
| | | | $S_7 = 0.007$ | | |
| | $R_{15} = 3.089$ | | | | |
| L8 | | $T_8 = 0.193$ | | 1.697 | 55.5 |
| | $R_{16} = -1.236$ | | | | | where L1–L8 are the lens elements from the object side, R1–R16 are the surface radii of the lens elements, T1–T8 are the axial thicknesses of elements L1–L8 respectively, S1–S7 are the axial spacings between elements L1–L8, $N_d$ is the index of refraction of the elements and $V_d$ is the dispersion of the elements measured by the Abbe number.

7. A lens according to claim 1 defined substantially as follows where the equivalent focal length of the lens is 1.0 and all dimensions are ratios of the actual dimension to the equivalent focal length:

| Element | Surface Radii (R) | Lens Element Thickness (T) | Spacing Between Lens Elements (S) | $N_d$ | $V_d$ |
|---|---|---|---|---|---|
| L1 | $R_1 = 1.552$ | $T_1 = 0.144$ | | 1.517 | 64.2 |
| | $R_2 = 8.704$ | | | | |
| | | | $S_1 = 0.007$ | | |
| L2 | $R_3 = 1.233$ | $T_2 = 0.070$ | | 1.667 | 57.7 |
| | $R_4 = 0.434$ | | | | |
| | | | $S_2 = 0.290$ | | |
| L3 | $R_5 = 1.782$ | $T_3 = 0.056$ | | 1.487 | 70.4 |
| | $R_6 = 0.754$ | | | | |
| | | | $S_3 = 0.148$ | | |
| L4 | $R_7 = 0.828$ | $T_4 = 0.193$ | | 1.757 | 28.6 |
| | $R_8 = 3.553$ | | | | |
| | | | $S_4 = 0.133$ | | |
| L5 | $R_9 = 3.592$ | $T_5 = 0.193$ | | 1.643 | 59.8 |
| | $R_{10} = 0.771$ | | | | |
| | | | $S_5 = 0.082$ | | |
| L6 | $R_{11} = -0.616$ | $T_6 = 0.054$ | | 1.805 | 25.5 |
| | $R_{12} = 1.955$ | | | | |
| | | | $S_6 = 0.075$ | | |
| L7 | $R_{13} = 1.320$ | $T_7 = 0.133$ | | 1.659 | 58.4 |
| | $R_{14} = 0.627$ | | | | |
| | | | $S_7 = 0.007$ | | |
| L8 | $R_{15} = 3.027$ | $T_8 = 0.148$ | | 1.697 | 55.5 |
| | $R_{16} = 1.280$ | | | | | where L1–L8 are the lens elements from the object side, R1–R16 are the surface radii of the lens elements, T1–T8 are the axial thicknesses of elements L1–L8 respectively, S1–S7 are the axial spacings between elements L1–L8, $N_d$ is the index of refraction of the elements and $V_d$ is the dispersion of the elements measured by the Abbe number.

8. A lens according to claim 1 defined substantially as follows where the equivalent focal length of the lens is 1.0 and all dimensions are ratios of the actual dimension to the equivalent focal length:

| Element | Surface Radii (R) | Lens Element Thickness (T) | Spacing Between Lens Elements (S) | $N_d$ | $V_d$ |
|---|---|---|---|---|---|
| L1 | $R_1 = 1.736$ | $T_1 = 0.163$ | | 1.697 | 55.5 |
| | $R_2 = 7.514$ | | | | |
| | | | $S_1 = 0.004$ | | |
| L2 | $R_3 = 1.517$ | $T_2 = 0.082$ | | 1.697 | 55.5 |
| | $R_4 = 0.440$ | | | | |
| | | | $S_2 = 0.221$ | | |
| L3 | $R_5 = 1.288$ | $T_3 = 0.061$ | | 1.487 | 70.4 |
| | $R_6 = 0.652$ | | | | |
| | | | $S_3 = 0.151$ | | |
| L4 | $R_7 = 0.866$ | $T_4 = 0.193$ | | 1.744 | 27.6 |
| | $R_8 = 12.092$ | | | | |
| | | | $S_4 = 0.132$ | | |
| L5 | $R_9 = 5.954$ | $T_5 = 0.193$ | | 1.651 | 59.1 |
| | $R_{10} = -0.725$ | | | | |
| | | | $S_5 = 0.049$ | | |
| L6 | $R_{11} = -0.646$ | $T_6 = 0.097$ | | 1.805 | 25.5 |
| | $R_{12} = 1.889$ | | | | |
| | | | $S_6 = 0.067$ | | |
| L7 | $R_{13} = -1.917$ | $T_7 = 0.169$ | | 1.686 | 56.2 |
| | $R_{14} = -0.661$ | | | | |
| | | | $S_7 = 0.004$ | | |
| L8 | $R_{15} = 4.018$ | $T_8 = 0.166$ | | 1.640 | 60.2 |
| | $R_{16} = -1.432$ | | | | | where L1–L8 are the lens elements from the object side, R1–R16 are the surface radii of the lens elements, T1–T8 are the axial thicknesses of elements L1–L8 respectively, S1–S7 are the axial spacings between elements L1–L8, $N_d$ is the index of refraction of the elements and $V_d$ is the dispersion of the elements measured by the Abbe number.

9. A lens according to claim 1 defined substantially as follows where the equivalent focal length of the lens is 1.0 and all dimensions are ratios of the actual dimension to the equivalent focal length:

| Element | Surface Radii (R) | Lens Element Thickness (T) | Spacing Between Lens Elements (S) | $N_d$ | $V_d$ |
|---|---|---|---|---|---|
| L1 | $R_1 = 2.384$ | $T_1 = 0.201$ | | 1.542 | 61.1 |
| | $R_2 = 13.791$ | | | | |
| | | | $S_1 = 0.008$ | | |
| L2 | $R_3 = 1.354$ | $T_2 = 0.082$ | | 1.697 | 55.5 |
| | $R_4 = 0.510$ | | | | |
| | | | $S_2 = 0.320$ | | |
| | $R_5 = 1.449$ | | | | |

-continued

| Element | Surface Radii (R) | Lens Element Thickness (T) | Spacing Between Lens Elements (S) | $N_d$ | $V_d$ |
|---|---|---|---|---|---|
| L3 | | $T_3 = 0.061$ | | 1.487 | 70.4 |
| | R6 = 0.543 | | | | |
| | | | $S_3 = 0.199$ | | |
| | R7 = 1.042 | | | | |
| L4 | | $T_4 = 0.225$ | | 1.705 | 29.5 |
| | R8 = −6.649 | | | | |
| | | | $S_4 = 0.157$ | | |
| | R9 = −84.000 | | | | |
| L5 | | $T_5 = 0.225$ | | 1.614 | 52.7 |
| | R10 = −0.743 | | | | |
| | | | $S_5 = 0.062$ | | |
| | R11 = −0.727 | | | | |
| L6 | | $T_6 = 0.074$ | | 1.805 | 25.5 |
| | R12 = 2.171 | | | | |
| | | | $S_6 = 0.066$ | | |
| | R13 = −3.165 | | | | |
| L7 | | $T_7 = 0.169$ | | 1.618 | 61.1 |
| | R14 = −0.721 | | | | |
| | | | $S_7 = 0.008$ | | |
| | R15 = 6.386 | | | | |
| L8 | | $T_8 = 0.161$ | | 1.640 | 60.2 |
| | R16 = −1.353 | | | | | where L1–L8 are the lens elements from the object side, R1–R16 are the surface radii of the lens elements, T1–T8 are the axial thicknesses of elements L1–L8 respectively, S1–S7 are the axial spacings between elements L1–L8, $N_d$ is the index of refraction of the elements and $V_d$ is the dispersion of the elements measured by the Abbe number.

10. A lens according to claim 1 defined substantially as follows where the equivalent focal length of the lens is 1.0 and all dimensions are ratios of the actual dimension to the equivalent focal length:

| Element | Surface Radii (R) | Lens Element Thickness (T) | Spacing Between Lens Elements (S) | $N_d$ | $V_d$ |
|---|---|---|---|---|---|
| L1 | R1 = 2.153 | $T_1 = 0.203$ | | 1.487 | 70.4 |
| | R2 = 17.462 | | | | |
| | | | $S_1 = 0.004$ | | |
| | R3 = 1.481 | | | | |
| L2 | | $T_2 = 0.082$ | | 1.697 | 55.5 |
| | R4 = 0.520 | | | | |
| | | | $S_2 = 0.368$ | | |
| | R5 = 1.513 | | | | |
| L3 | | $T_3 = 0.061$ | | 1.487 | 70.4 |
| | R6 = 0.547 | | | | |
| | | | $S_3 = 0.163$ | | |
| | R7 = 1.231 | | | | |
| L4 | | $T_4 = 0.225$ | | 1.753 | 27.3 |
| | R8 = −7.445 | | | | |
| | | | $S_4 = 0.201$ | | |
| | R9 = ∞ | | | | |
| L5 | | $T_5 = 0.225$ | | 1.669 | 57.6 |
| | R10 = −0.758 | | | | |
| | | | $S_5 = 0.065$ | | |
| | R11 = −0.877 | | | | |
| L6 | | $T_6 = 0.174$ | | 1.805 | 25.5 |
| | R12 = 2.056 | | | | |
| | | | $S_6 = 0.057$ | | |
| | R13 = −6.073 | | | | |
| L7 | | $T_7 = 0.169$ | | 1.607 | 61.7 |
| | R14 = −0.836 | | | | |
| | | | $S_7 = 0.004$ | | |
| | R15 = 4.717 | | | | |
| L8 | | $T_8 = 0.154$ | | 1.640 | 60.2 |
| | R16 = −1.710 | | | | | where L1–L8 are the lens elements from the object side, R1–R16 are the surface radii of the lens elements, T1–T8 are the axial thicknesses of elements L1–L8 respectively, S1–S7 are the axial spacings between elements L1–L8, $N_d$ is the index of refraction of the elements and $V_d$ is the dispersion of the elements measured by the Abbe number.

11. A retrofocus lens consisting of eight airspaced elements from the object end as follows: a first positive meniscus convex to the object end, second and third negative menisci convex to the object end, a fourth positive element convex to the object, a fifth positive element convex to the image end, a sixth biconcave element spaced at least 0.04 of the equivalent focal length of said lens from said fifth element, a seventh positive meniscus convex to the image end and an eighth biconvex element, said fourth and fifth elements having facing surfaces defined on radii substantially greater than the focal length of said lens, an aperture defining means positioned between the facing surfaces of said fourth and fifth elements.

12. The lens of claim 11 where said first through fourth elements have Abbe numbers V1–V4, respectively, and $$57 < (V1 + V2 + V3)/3 < 66$$

$$27 < V4 < 30.$$

13. The lens of claim 11 where the facing surfaces of said fourth and fifth elements are defined on radii at least three times the equivalent focal length of said lens, and at least one of the convex surfaces thereof is defined on a radius less than the equivalent focal length of said lens.

14. The lens of claim 11 where the sum of the radii defining the convex surfaces of the fourth and fifth elements is no more than twice the equivalent focal length of the lens.

15. The lens of claim 11 where the air space between the fourth and fifth elements varies as the lens is focused to its closest focusing diameter.

16. The lens of claim 11 wherein the sum of the radii defining the convex surface of the fourth and fifth elements is no more than twice the equivalent focal length of the lens.

* * * * *

UNITED STATES PATENT AND TRADEMARK OFFICE
CERTIFICATE OF CORRECTION

PATENT NO. : 4,258,980
DATED : March 31, 1981
INVENTOR(S) : JACOB MOSKOVICH

It is certified that error appears in the above-identified patent and that said Letters Patent are hereby corrected as shown below:

Please correct errors as listed below:

Column 1, Line 68, "1.10" should be --1:10--

Column 2, Line 6, "1.10" should be --1:10--

Column 2, Line 36, "EEL" should be --EFL--

Column 4, Line 3 (Heading), "$F_1$ 32 -0.996" should be --$F_1 = -0.996$--

Column 12, Line 59, Claim 16, "wherein the sum" should be --where the sum--

Signed and Sealed this

Eighteenth Day of August 1981

[SEAL]

Attest:

GERALD J. MOSSINGHOFF

Attesting Officer         Commissioner of Patents and Trademarks